Nov. 6, 1962 C. M. RIPPS 3,061,996
MOWER
Filed Sept. 1, 1959 3 Sheets-Sheet 1
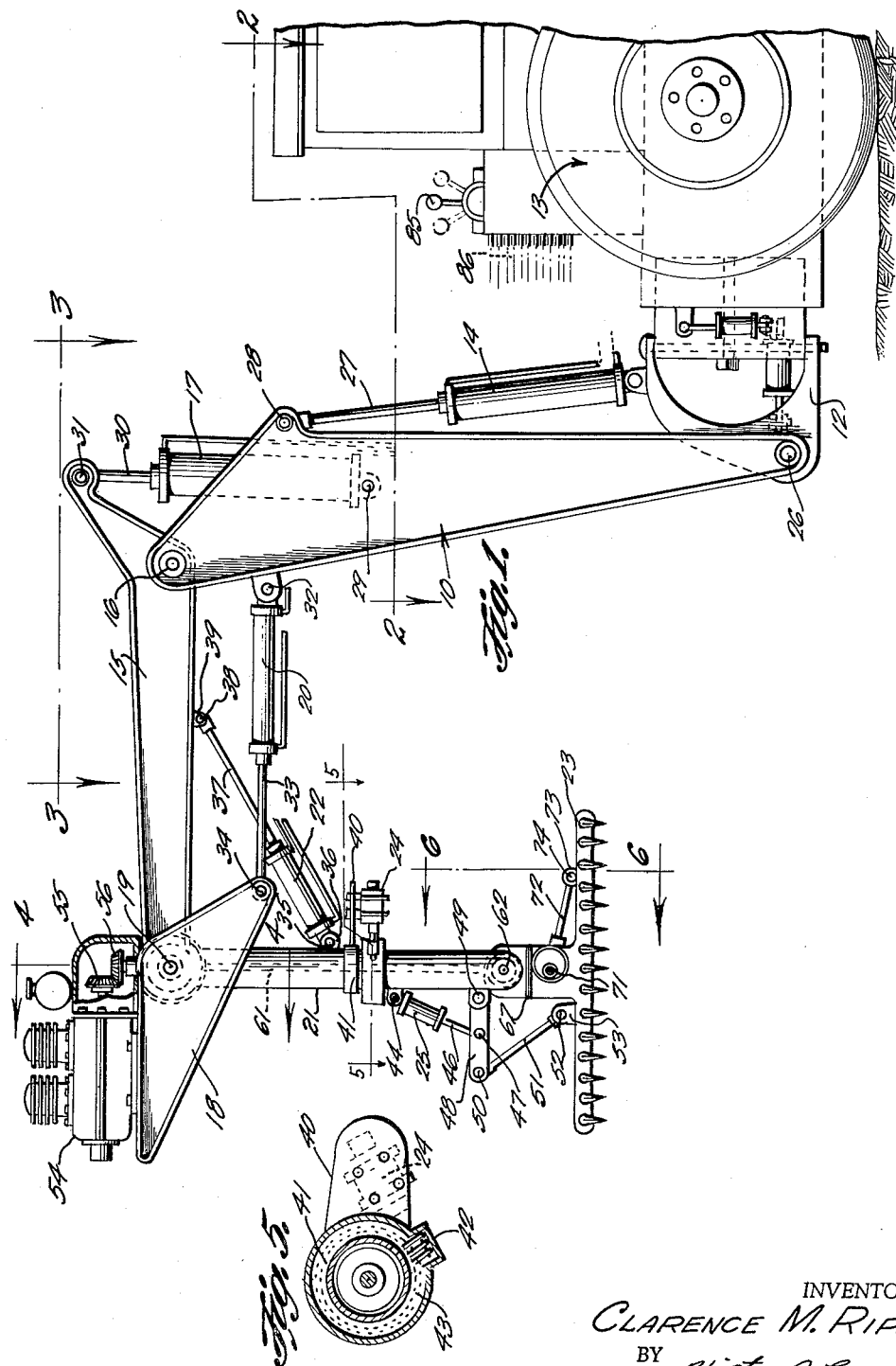
INVENTOR.
CLARENCE M. RIPPS
BY Victor J. Evans & Co.
Attorneys Nov. 6, 1962 C. M. RIPPS 3,061,996
MOWER
Filed Sept. 1, 1959 3 Sheets-Sheet 2
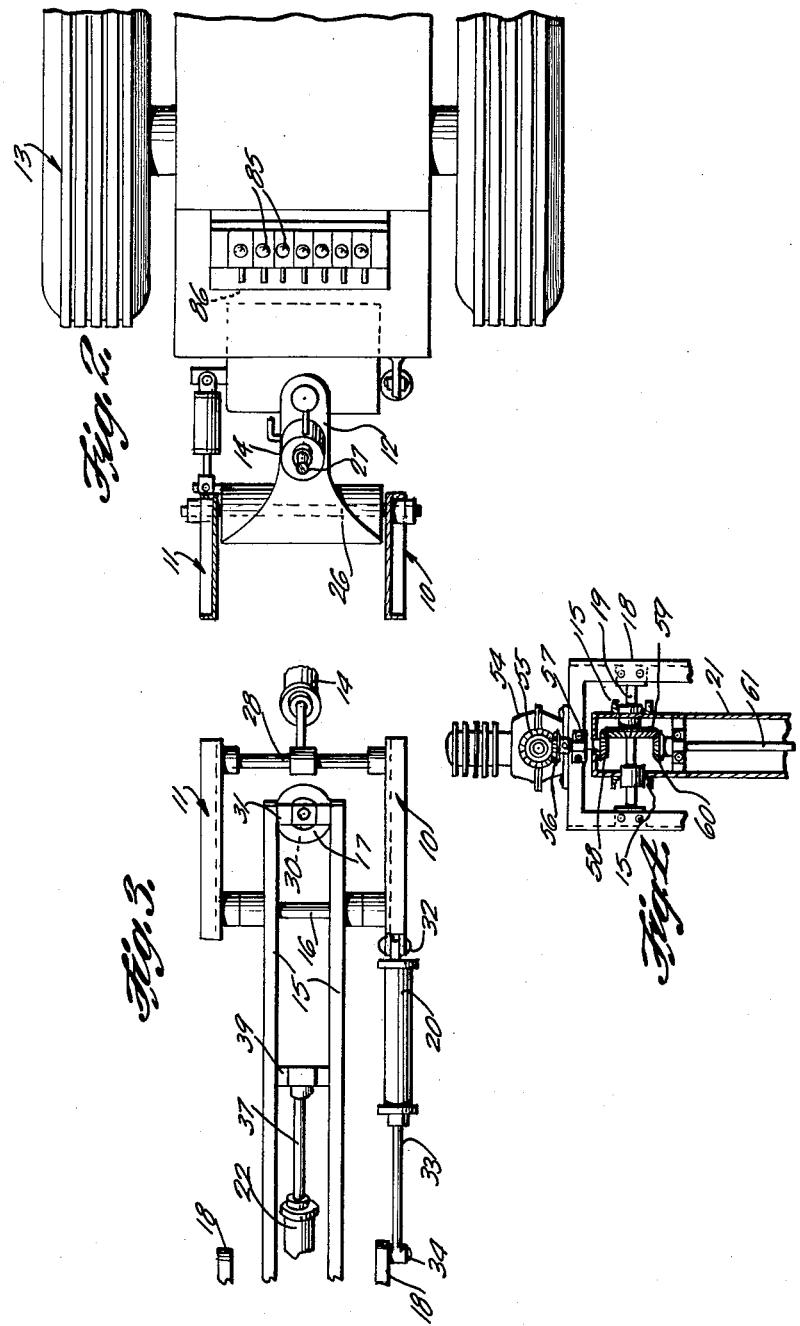
INVENTOR.
CLARENCE M. RIPPS
BY
Victor J. Evans & Co.
Attorneys Nov. 6, 1962  C. M. RIPPS  3,061,996
MOWER
Filed Sept. 1, 1959  3 Sheets-Sheet 3
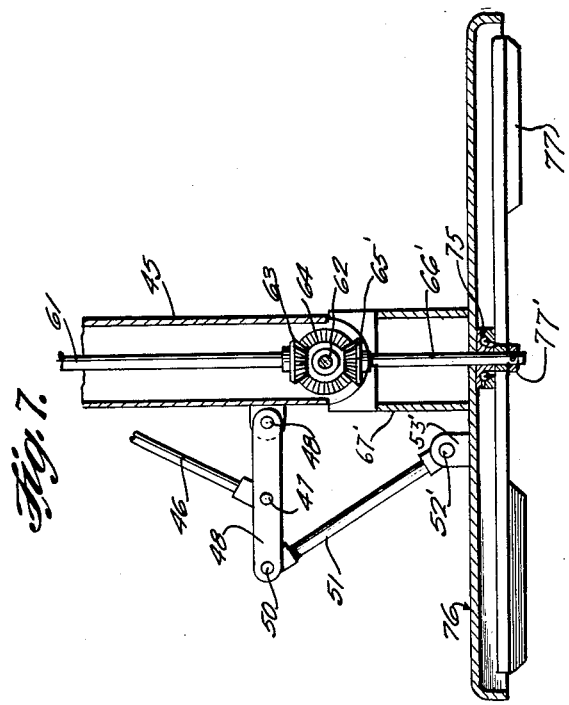
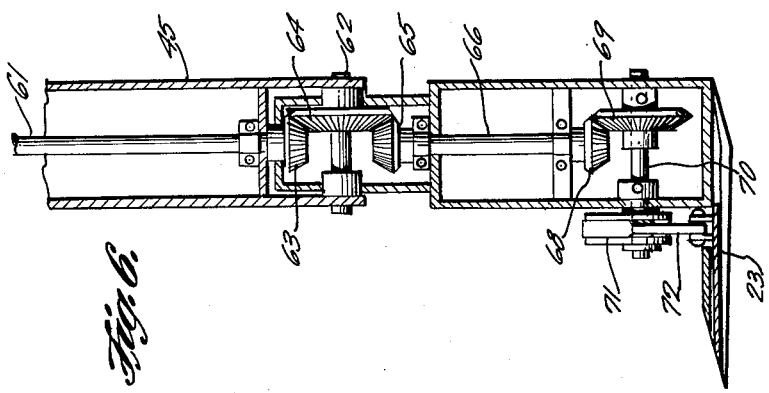
INVENTOR.
CLARENCE M. RIPPS
BY

United States Patent Office 3,061,996
Patented Nov. 6, 1962

3,061,996
MOWER
Clarence M. Ripps, 136 Roesher Road, San Antonio, Tex.
Filed Sept. 1, 1959, Ser. No. 837,505
2 Claims. (Cl. 56—25)

The present invention relates to a mower for mounting on a tractor having hydraulic power equipment.

The purpose of this invention is to provide a multiple joint back hoe arm designed to be mounted on the rear of a tractor and in which a mower attachment such as a cutter bar or rotary blade may be operatively mounted on the extended end.

In numerous instances, such as in parks, golf courses, and also along streams, rivers, and lakes it is desirable to cut grass, weeds, bushes and the like and for such uses conventional mowing machines are not practical. With this thought in mind this invention contemplates an arm designed to be mounted on a tractor and having a bar cutter blade carried by the extended end. The object of this invention is, therefore, to provide means for mounting a power mower on a tractor with a universal arm.

Another object of the invention is to provide means for mounting a mower on a tractor whereby the mower may extend over obstacles and operate in substantially inaccessible places.

Another important object of the invention is to provide means for mounting a power mower blade on an arm in which the mounting elements are accessible to facilitate repair.

A further object of the invention is to provide an arm designed to be mounted on a tractor and having mower mounting and operating elements on an extended end in which the arm is of a simple and economical construction.

With these and other objects and advantages in view the invention embodies a mower assembly including arms pivotally mounted on a tractor and actuated by hydraulic elements, a boom pivotally mounted in upper ends of the arms and also actuated by a hydraulic cylinder, a motor platform pivotally mounted on the extended end of the boom and actuated by hydraulic cylinder from the arms mounted on the tractor, a post suspended from the boom and motor platform and having a brace with a hydraulic cylinder extended to the boom, and a cutting element carried on the lower end of the post.

Other features and advantages of the invention will appear from the following description taken in connection with the drawings, wherein:

FIGURE 1 is a side-elevational view partly in section and partly broken away illustrating the mower mounting arms and showing the cutting element in an elevated position.

FIGURE 2 is a transverse sectional view, partly broken away, on the line 2—2 of FIGURE 1.

FIGURE 3 is a plan view, partly in section and partly broken away, taken on line 3—3 of FIGURE 1 showing the connection of the boom to the arms extended from the tractor.

FIGURE 4 is a vertical section taken on line 4—4 of FIGURE 1 showing the motor platform and driving gears for operating a shaft in the post by the motor.

FIGURE 5 is a transverse sectional view on the line 5—5 of FIGURE 1 showing a motor for rotating the post on which the mower element is positioned.

FIGURE 6 is a vertical section taken substantially on line 6—6 of FIGURE 1 showing the cutter driving gear assembly.

FIGURE 7 is a side-elevational view partly in section, partly broken away, and is similar to that shown in FIGURE 1 showing a modification wherein a cutter bar for the mower shown in FIGURE 1 is replaced by a rotary cutter.

Referring now to the drawings wherein like reference characters denote corresponding parts the improved attachment for mounting a mower on a tractor, of this invention includes arms 10 and 11 mounted on a yoke 12 of a tractor 13, a hydraulic cylinder 14 for actuating the arms 10 and 11, a boom 15 pivotally mounted by a shaft 16 in upper ends of the arms 10 and 11, a hydraulic cylinder 17 for actuating the boom 15, a motor platform 18 pivotally mounted by a shaft 19 in the end of the boom, a hydraulic cylinder 20 for actuating the motor platform 18, a post 21 in the upper end of which the shaft 19 is rotatably mounted, a hydraulic cylinder 22 for adjusting the angle between the post and the boom, a cutter bar 23 carried on the lower end of the post, a motor 24 for rotating the lower portion of the post and the hydraulic cylinder 25 for adjusting the angle of the cutter bar in relation to the post.

The arms 10 and 11, yoke 12, and cylinders 14 and 17 are conventional, being provided with many types of tractors.

The arms 10 and 11 are pivotally mounted by a shaft 26 in the member 12 and the piston rod 27 of the cylinder 14 is pivotally connected to the arms by a shaft 28 and the cylinder 14 is pivotally connected to the yoke 12 by a shaft 28'. The cylinder 17 is pivotally mounted by a shaft 29 between the arms and the upper end of the piston rod 30 thereof is pivotally connected by a bolt 31 to an upwardly extended end of the boom 15.

The cylinder 20 is pivotally connected by a bolt 32 to the arm 10 and the piston rod 33 thereof is connected to a depending end of the motor platform 18 by a bolt 34. The cylinder 22 is pivotally connected by a pin 35 to ears 36 of the post 21 and the piston rod 37 of the cylinder 22 is connected by a pin 38 to ears 39 on the lower side of the boom.

The motor 24 is supported by an arm 40 extended from a bracket 41 on a lower section 45 of the post 21 and a worm 42 on the motor shaft is positioned in meshing relation with a worm gear 43 on the lower section 45 of the post 21.

The cylinder 25 is pivotally mounted by a pin 44 on the lower section 45 of the post and a piston rod 46 extended from the cylinder 25 is pivotally connected by a pin 47 to a lever 48 pivotally mounted by a pin 49 on the section 45 of the post. The extended end of the lever 48 is connected by a pin 50 to a rod 51, the lower end of which is connected by a pin 52 to ears 53 on the cutter bar 23.

The cutter bar or mower element is operated by an engine or motor 54 on the motor platform 18 through gear assemblies as illustrated in FIGURES 1, 4 and 6. The engine shaft is provided with a bevel gear 55 that meshes with a bevel gear 56 on the upper end of a shaft 57, on the lower end of which is a bevel pinion 58 that meshes with a bevel gear 59 on the shaft 19 and the bevel gear 59 meshes with a bevel pinion 60 on the upper end of a shaft 61 that extends downwardly to a pivotal connection formed by a shaft 62. A bevel pinion 63 on the lower end of the shaft 61 meshes with a bevel gear 64 on the shaft 62 and the bevel gear 64 meshes with a bevel pinion 65 on the upper end of a shaft 66 that extends through a lower section 67 of the hoe and that is provided with a bevel pinion 68 that meshes with a bevel gear 69 on a shaft 70 on which a pitman or accentric 71 is positioned. A pitman arm 72 extends from the accentric to an ear 73 on the cutter bar to which the extended end of the pitman arm is connected by a pin 74.

The cutter bar 23 is of conventional design and the pitman arm may be connected to the sickle bar by conventional means.

When it is desired to use a rotary cutting blade or rotary mower a shaft 66' is used to replace the shaft 66, and the shaft 66' is provided with a bevel pinion 65' on the upper end and the lower end of the shaft 66' is carried through a bearing 75 in a shield 76 on the lower end of a section 67' that replaces the section 67 of the post 21 and the cutting blades 77 are secured to the lower end of the shaft 66', by a nut 77'. It will be understood that a mower element of any suitable type or design may be used. In this form of the invention the piston rod 46, and arm 48 are connected as previously described, but the rod 51 is connected at the lower end thereof by a pin 52' to ears 53' on the section 67'.

It will be understood that auger attachments may be used in combination with the mower and the parts may be attached and connected by suitable means.

The different hydraulic cylinders are supplied with fluid under pressure from pressure means of a tractor and hose extended from the hydraulic cylinders to a control panel 85 positioned on the tractor whereby each movement of the mower attachment may be controlled by an operator on the tractor.

It will be understood that other modifications, within the scope of the appended claims, may be made in the design and arrangement of the parts without departing from the spirit of the invention.

What is claimed is:

1. In a mower attachment, the combination which comprises a pair of vertically disposed arms, means for pivotally mounting the arms on a tractor, a hydraulic cylinder mounted on the tractor and operatively connected to the arms for adjusting the positions of the arms, a boom pivotally mounted in extended ends of the arms, a hydraulic cylinder mounted in the arms and operatively connected to the boom for adjusting the position of the boom, a motor platform pivotally mounted in the extended end of the boom, a hydraulic cylinder mounted on one of the arms and operatively connected to the motor platform for adjusting the position of the motor platform, a post having upper and lower sections depending from the motor platform, a power mower carried by the lower end of the post, a motor on the motor platform, means operatively connecting the motor to the mower through the post, means for adjusting the angular position of the mower on the lower end of the post, and means for rotating the lower end of the post.

2. In a power mower attachment, for a tractor, the combination which comprises a pair of vertically disposed arms pivotally mounted on a tractor, a hydraulic cylinder mounted on the tractor and operatively connected to the arms for adjusting the positions of the arms, a boom pivotally mounted in extended ends of the arms, a hydraulic cylinder mounted in the arms and pivotally connected to the boom for adjusting the position of the boom, a motor platform pivotally mounted on the extended end of the boom, a hydraulic cylinder mounted on one of the arms and operatively connected to the motor platform for adjusting the position of the platform, a post having an upper section depending from the motor platform, a hydraulic cylinder mounted on the upper section of the post and operatively connected to the boom for adjusting the angular position of the post in relation to the boom, a lower section of the post having a ring gear thereon rotatably mounted on the lower end of said upper section, a motor having a shaft carried by the upper section of the post, a worm mounted on the motor shaft and positioned to mesh with the ring gear on the lower section of the post for rotating the lower section of the post, a cutter mounted on the lower section of the post, a motor mounted on the mower platform, means operatively connecting the motor to the cutter through the post, and means for adjusting the angular position of the cutter in relation to the post.

References Cited in the file of this patent

UNITED STATES PATENTS

| | | |
|---|---|---|
| 2,648,940 | Merkley et al. | Aug. 18, 1953 |
| 2,863,273 | Turner | Dec. 9, 1958 |